Figure 1:
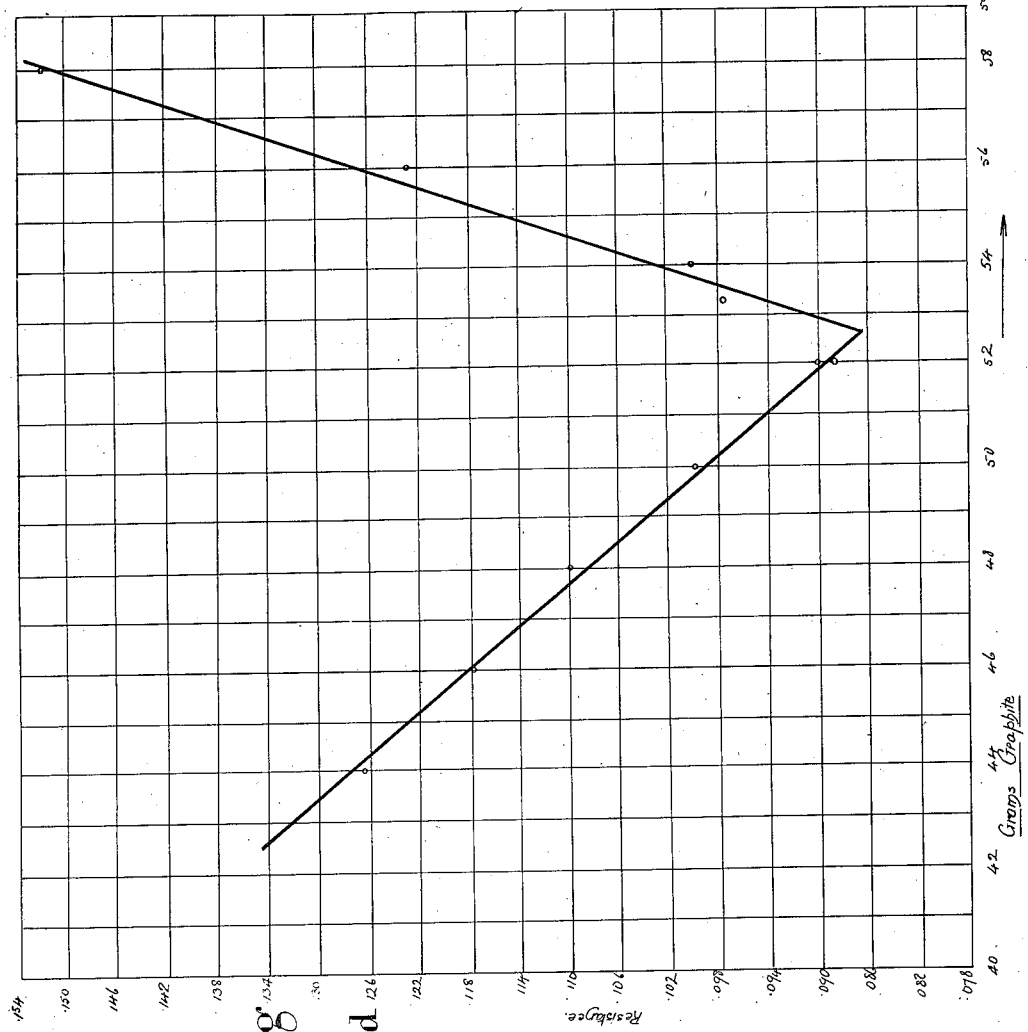

G. N. ANTONOFF.
ELECTRIC BATTERY.
APPLICATION FILED AUG. 12, 1918.

1,303,843.

Patented May 20, 1919.
2 SHEETS—SHEET 1.

G. N. Antonoff
Inventor
By H. R. Kerslake
Attorney

UNITED STATES PATENT OFFICE.

GEORGE NIKOLAYEVICH ANTONOFF, OF LONDON, ENGLAND.

ELECTRIC BATTERY.

1,303,843.        Specification of Letters Patent.        Patented May 20, 1919.

Application filed August 12, 1918. Serial No. 249,552.

*To all whom it may concern:*

Be it known that I, GEORGE NIKOLAYEVICH ANTONOFF, a subject of Russia, and residing at India House, Kingsway, London, W. C., 2, England, have invented certain new and useful Improvements Relating to Electric Batteries, of which the following is a specification.

This invention relates to electric batteries, and especially to primary cells whether in the wet or so-called "dry" form in which zinc is used as the source of energy, and carbon is used for the negative pole with manganese dioxid as the depolarizer. The carbon electrode has usually in close contact with it a mixture consisting of finely divided manganese dioxid and finely divided graphite, with or without an agglutinant, molded or pressed together under a heavy pressure, and it has hitherto been believed that better results were obtained, the higher the pressure employed.

It has even been proposed to employ pressures as high as 2000 lbs. per square inch. Again, in a form of cell having a movable zinc plate it has been proposed to employ springs pressing the plate through a flexible diaphragm against a cellulose layer impregnated with the electrolyte which in turn presses on the depolarizer mixture within the containing casing.

Now I have found by experiment that there is a critical point in the relation between the internal resistance of the cell, and the pressure to which the mixture of manganese dioxid and carbon has been subjected. As the pressure to which the mixture has been submitted is increased from zero, the internal resistance is found to diminish up to a point, and after that is passed, to increase steadily.

Further, in the ordinary Leclanché cell on closed circuit through an external resistance of say 10 ohms for example, the characteristic of the current or electromotive-force curve plotted to a time base is that it rapidly falls from the beginning, has a short approximately horizontal part about the region of 0.8 of volt, and then falls away rapidly again, becoming in a short time practically useless.

Now I have found that when the depolarizing mixture has been compressed to about the point which gives the least internal resistance, the horizontal part of the curve is very greatly extended, and the useful life of the cell becomes correspondingly greater.

The invention consists broadly in a Leclanché type cell in which the depolarizing mixture has been pressed to about the critical pressure above indicated.

The invention further consists in providing for maintenance of the depolarizing mixture under a pressure at or about the critical pressure during the life of the cell.

The invention also consists in the improved Leclanché type cells and features of construction hereinafter described.

Figure 1 shows the curve obtained by plotting the internal resistances of a series of cells (determined by the Wheatstone bridge null method using a telephone as the detector) as ordinates against the apparent density of the depolarizer mass or more strictly the weight of depolarizer mixture occupying a given volume, which is a measure of the pressure to which the mass has been submitted. The actual abscissæ are weights of the graphite component of the mixtures for the same volume.

Figure 2:
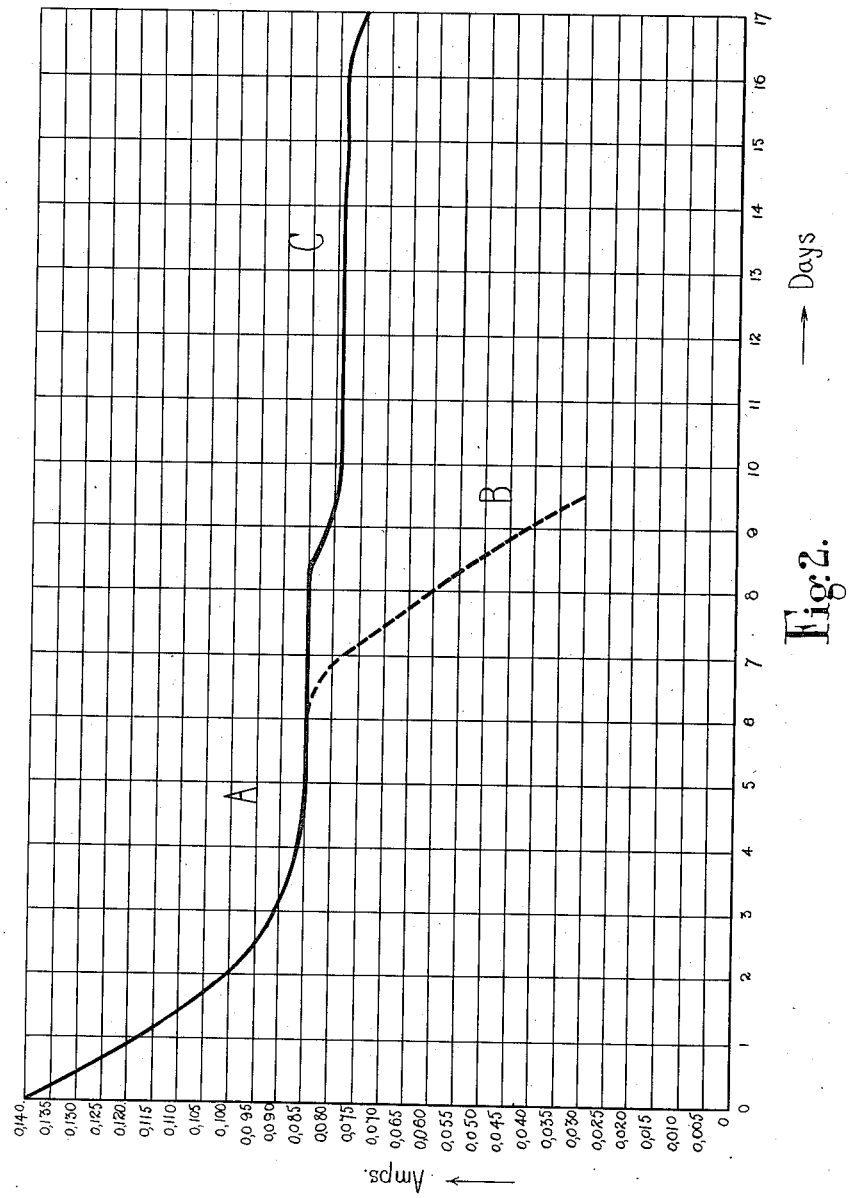

Fig. 2 illustrates typical discharge curves. The curve A—B is typical of that from an ordinary Leclanché cell, and the curve A—C is typical of that from a cell according to the present invention. These discharge curves are obtained by discharge through an external resistance of 10 ohms with a cell of 55 mm. square by 125 mm. long.

Figure 3:
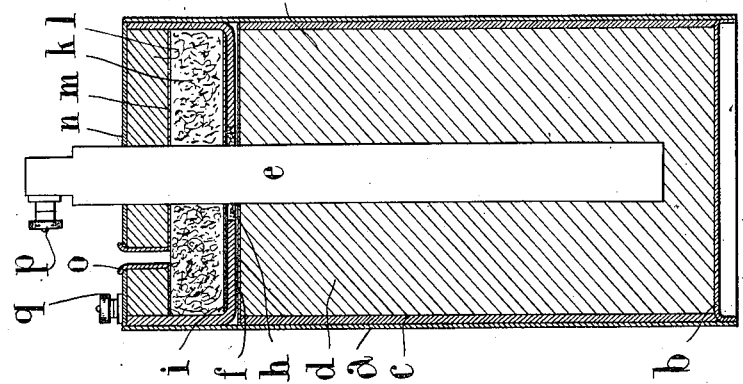

Fig. 3 illustrates diagrammatically one form of cell according to this invention, in which $a$ is a zinc cylinder sufficiently thick not to be deformed by any pressure developing during working. The bottom $b$ is conveniently formed of a dished disk, autogenously welded to the cylinder. $c$ is the usual absorbent layer employed inside the cylinder to permit only of electrolytic conduction between the zinc and the carbon poles. $d$ is a depolarizer mass, and $e$ is the carbon electrode; $f$ is a layer of paper on the top of the depolarizer mass; $g$ is a zinc cover plate with upwardly projecting flange and a hole somewhat larger than the diameter of the carbon, to permit of the insertion of a centralizing ring of cardboard $h$. $i$ is another paper washer placed on the top of the zinc disk and cardboard ring. $k$ is a layer of husks to absorb any liquid which may exude from the cell. $l$ is a layer of pitch sealing in the husks in position; and $m$ is a further paper disk separating the pitch and the husks. $n$ is a layer of bitumen on the top of the pitch, and $o$ is a vent through the pitch and bitumen. The zinc cap or disk $g$ is autogenously welded in place in the zinc cylinder, and is stiff enough to prevent any longitudinal expansion of the depolarizer mass during the life of the cell. $p$ is a carbon terminal, and $q$ a terminal on the zinc cylinder.

In carrying this invention into effect in one form, I provide a molding cylinder, into which I insert the carbon electrode, and I fill in a depolarizer paste made of the usual composition of graphite and manganese dioxid. I find it is desirable to divide the manganese dioxid as finely as possible, but the graphite is ground to about the usual fineness. The paste is made up with distilled water, a mixture of say 40% graphite with 60% $MnO_2$ being used, and is filled in around the carbon plate. Pressure is then applied by means of suitable molding blocks in a screw or hydraulic press, and the predetermined pressure thus put upon the depolarizer mass.

It is found that with all the ordinary varieties of the components of the mixture, there is a critical region of pressure, within which the internal resistance attains a minimum value. The absolute value of this critical pressure, however, varies with the actual materials used, viz., with the quality and state of division of the graphite and the manganese dioxid. It is therefore necessary to determine for every given batch of materials what the critical pressure is. This may be done readily by an actual experiment, making a number of cells with different pressures, and plotting the internal resistances against the different pressures.

When the depolarizer has been molded around the plate under the critical pressure, as above described, it is removed from the press, and the molded block is forced out of the mold. It will be found that its surface is still slightly plastic, so that it can be slightly deformed with the fingers. The critical pressure may vary from about 20 lbs. to about 70 lbs. per square inch.

The negative pole thus prepared is placed in a suitable zinc container with the usual solution soaked lining and the cell completed in the usual way.

I prefer however, to make the zinc container or the latter with its casing of such strength that the pressure is maintained during the life of the cell and expansion of the depolarizer is practically prevented.

In carrying the invention into effect in another form, I make the zinc container of preferably autogenously welded zinc parts and strengthen them circumferentially say by providing reinforcing bands at intervals along their length.

In making up cells according to this invention in another form I provide a layer of inert bitumen between the outer casing and the zinc container. The bitumen may be placed in the bottom of the outer case and the zinc container pressed into position so that the bitumen is pressed out into a thin layer between the two. In this way a perfectly impermeable layer is formed which retains all liquid in the event of perforation of the zinc which is liable to take place when the life of the cell is lengthened. The outer casing may be of cardboard.

In still another form the outer casing may be relied on to provide the resistance to expansion desired for maintaining the pressure about the required point.

This maintenance of pressure is desirable for obtaining the best results.

The outer casing may thus be of thin metal or of papier mâché, celluloid or the like, of sufficient strength for the purpose and in some cases the layer of bitumen may be sealed in and put under pressure.

Having now described my invention, what I claim as new and desire to secure by Letters Patent is:—

1. An electric cell having a depolarizer mixture subjected to a pressure in the region of the critical pressure giving an internal resistance to the cell about a minimum value.

2. An electric cell having a depolarizer mixture subjected to a pressure in the region of the critical pressure giving an internal resistance to the cell about a minimum value, provided with means for maintaining the internal resistance at about that value.

3. An electric cell having an anode principally composed of zinc; a depolarizer mixture subjected to a pressure in the region of the critical pressure giving an internal resistance to the cell about a minimum value, provided with means for maintaining the internal resistance at about that value, said means being independent of the mechanical strength of the zinc anode.

In testimony whereof I have signed my name to this specification.

GEORGE NIKOLAYEVICH ANTONOFF.